US011975425B2

(12) United States Patent
Sjösten

(10) Patent No.: US 11,975,425 B2
(45) Date of Patent: May 7, 2024

(54) POWER WRENCH COMPRISING A HYDRAULIC PULSE UNIT

(71) Applicant: ATLAS COPCO INDUSTRIAL TECHNIQUE AB, Stockholm (SE)

(72) Inventor: Roger Tobias Sjösten, Stockholm (SE)

(73) Assignee: ATLAS COPCO INDUSTRIAL TECHNIQUE AB, Stockholm (SE)

( * ) Notice: Subject to any disclaimer, the term of this patent is extended or adjusted under 35 U.S.C. 154(b) by 580 days.

(21) Appl. No.: 17/274,697

(22) PCT Filed: Aug. 30, 2019

(86) PCT No.: PCT/EP2019/073217

§ 371 (c)(1),
(2) Date: Mar. 9, 2021

(87) PCT Pub. No.: WO2020/053000

PCT Pub. Date: Mar. 19, 2020

(65) Prior Publication Data

US 2022/0048167 A1 Feb. 17, 2022

(30) Foreign Application Priority Data

Sep. 10, 2018 (SE) .................................... 1830255-4

(51) Int. Cl.
*B25B 21/02* (2006.01)

(52) U.S. Cl.
CPC .................................. *B25B 21/026* (2013.01)

(58) Field of Classification Search
CPC ....... B25B 19/00; B25B 21/00; B25B 21/002; B25B 21/02; B25B 21/026; B25B 23/00;
(Continued)

(56) References Cited

U.S. PATENT DOCUMENTS 5,611,404 A * 3/1997 Biek ....................... B25B 21/02 173/1
6,110,045 A * 8/2000 Schoeps .................. B25B 21/02 464/25

(Continued)

FOREIGN PATENT DOCUMENTS

EP 1138442 A2 10/2001
EP 2569126 B1 6/2014

OTHER PUBLICATIONS

International Preliminary Report on Patentability (IPRP) dated Aug. 12, 2020 issued in International Application No. PCT/EP2019/073217.

(Continued)

*Primary Examiner* — Robert J Scruggs
(74) *Attorney, Agent, or Firm* — Holtz, Holtz & Volek PC

(57) ABSTRACT

A power wrench includes a hydraulic pulse unit that includes an impulse generator. A separating arrangement is provided to extract air from oil. The separating arrangement includes a disc-shaped separator element and a sealing arrangement arranged to provide a seal between the disc-shaped separator element and a receiving space in fluid communication with the oil chamber. The disc-shaped separator element provides a passageway between the oil chamber and the receiving space by a fluid opening. The separating arrangement also includes a partitioning element arranged in the receiving space, such that first and a second partial volumes are formed on sides of the partitioning element. The first and second partial volumes are in fluid communication, and the fluid opening is arranged on the first side of the partitioning element.

13 Claims, 4 Drawing Sheets

(58) Field of Classification Search
CPC ... B25B 23/14; B25B 23/1405; B25B 23/145; B25B 23/1453; B25B 23/1456; B25B 23/147; B25B 23/1475; Y10S 277/926
See application file for complete search history.

(56) References Cited

U.S. PATENT DOCUMENTS

| | | | |
|---|---|---|---|
| 9,259,826 | B2 | 2/2016 | Söderlund |
| 2001/0027871 | A1 | 10/2001 | Tokunaga |
| 2013/0056237 | A1 | 3/2013 | Söderlund |

OTHER PUBLICATIONS

International Search Report (ISR) dated Dec. 5, 2019 issued in International Application No. PCT/EP2019/073217.
Written Opinion dated Dec. 5, 2019 issued in International Application No. PCT/EP2019/073217.

* cited by examiner

POWER WRENCH COMPRISING A HYDRAULIC PULSE UNIT

TECHNICAL FIELD

The present invention generally relates to power tools for tightening of screws, more particularly to impulse type power tools having a hydraulic pulse unit and a separating arrangement for extracting air from oil.

TECHNICAL BACKGROUND

Electrical power tools for tightening are known to be used in various industries. For example, power wrenches of the impulse type comprising hydraulic pulse units are commonly used for continuous heavy production.

The hydraulic unit of such tools is filled with oil. These units however need to be designed to accommodate for heat expansion of the oil as the oil heats up during operation. Solution have been proposed wherein a small amount of air is introduced in the oil in order to absorb this heat expansion. In power wrenches of this type however, known problems include filling of the pulse unit with an exactly correct amount of oil such that there will be air enough left inside the pulse unit to absorb the expansion of the oil.

In order to alleviate some of these problems, attempts have been made to use an elastic element or accumulator to compensate for heat related expansions, which allows for that the pulse units can be filled up completely without leaving any air in the oil volume.

However, there are still problems remaining in that there will inevitably be a certain oil leakage, although initially small, from the pulse unit during operation of the wrench, which means that air will penetrate into the pulse unit in a corresponding amount. The result is that that there will be an increased amount of air inside the pulse unit over time. Accordingly, the percentage of air in the oil volume will increase successively, and after some time of operation of the wrench the increased amount of air in the pulse unit will cause an impaired efficiency.

Yet another solution proposed involves providing an air volume arranged in communication with the oil chamber in order to accommodate for the heat expansion. For example, as the oil expands a small amount of oil may be allowed to escape into such an air space hence causing the air in the space to compress and as the pulse unit cools down, the oil is sucked back into the oil chamber. However, as the oil is sucked back, there is a risk of air from the air volume being introduced into the oil chamber, again causing impaired efficiency.

Hence, there exists a need for improvement in the field of power wrenches comprising hydraulic pulse units.

SUMMARY OF THE INVENTION

Accordingly, it would be desirable to provide a power wrench where the percentage of air in the oil volume is kept low. In particular, it would be desirable to provide such a power wrench providing a low sensitivity to leakage and where the percentage of air hence may be kept low over time. To better address one or more of these concerns a tightening tool comprising a sealing arrangement and a disc shaped separator element as defined in the independent claims is provided. Preferred embodiments are defined in the dependent claims.

According to a first aspect of the invention a power wrench comprising a motor, an output shaft and a hydraulic pulse unit including an inertia drive member connected to the motor and rotatable about a rotation axis, an oil chamber enclosed in the inertia drive member and an impulse generating means, or mechanism, arranged to transfer intermittently kinetic energy to the output shaft is provided. Wherein the inertia drive member further comprises a rear part, or end piece, having a transverse wall, wherein a separating arrangement is provided for extracting air from oil, the separating arrangement comprising a disc shaped separator element and a sealing arrangement arranged to provide a seal between the disc shaped separator element and the transverse end wall, thereby partly delimiting a receiving space there between in fluid communication with the oil chamber, the disc shaped element further arranged to provide a passageway between the oil chamber and the receiving space by means of a fluid opening located at a radial distance a1 from the rotation axis, wherein the separating arrangement further comprises a partitioning element arranged in the receiving space, such that a first partial volume is formed on one side of the partitioning element and a second partial volume is formed on the other side, wherein the first and second partial volume are in fluid communication and wherein the opening is arranged on the first side.

According to the first aspect, the power wrench (or power tool or tightening tool, these terms are used interchangeably throughout the present specification) provides an inventive solution to the concerns described above by means of a design incorporating a separating arrangement comprising a disc shaped separator element separating the oil chamber from a receiving space and comprising an opening through which oil may flow between the oil chamber and the receiving space such that the oil may flow from the oil chamber to the receiving space via this opening when expanded upon heating and back again as the tool is stopped an the oil cools down, and further by means of a partitioning element partially dividing this receiving space into a first and second partial fluid volume portion which are in fluid communication.

More particularly, the design wherein the first and second partial volume, which may also be referred to as a first and second volume portion (these terms are used interchangeably throughout the present specification), are partially partitioned but still in fluid communication, allows for fluid present in the receiving space to move there between. It follows that the fluid in each volume portion may be air, oil or a mixture.

Further, this design cleverly solves the problem of ensuring a proper functionality of the rotating separating arrangement by means of an efficient "air trap" taking advantage of the difference in density between air and oil, ensuring that little or no air enters back into the oil chamber as the oil cools down as will be described in the following.

As the separating arrangement rotates along with the inertia drive member the relative orientation of the first and second volume portion formed by the partitioning element alternates during rotations. Further and (maybe) more importantly, as the rotational position of the opening off course also varies, and when the tool stops the rotational position and hence the rotational position of the opening in the disc shaped element is arbitrary. But due to the difference in density between air and oil, the air present will gather at an (in an exemplary use case where the output shaft extends in parallel to a horizontal surface of a work piece (i.e. where the disc shaped separator element is positioned substantially vertically)) upper part of the receiving space, whereas the heavier oil collects at the bottom of the space. This causes problems since the position of the flow opening on the other hand, as explained above is arbitrary as the tool may be stopped at any time. Hence, should the tool stop when the opening is positioned at the upper portion of the space, without the inventive partitioning element, a situation may arise wherein as the oils cools down air only would be sucked back into the oil chamber as the tool and hence the oil cools down, thereby significantly impairing the functionality of the tool.

The inventive partitioning element has therefore been introduced to ensure that a fluid connection for the oil to the opening is always provided. In a sense, the partitioning element may be described as adapted to allow the oil to form an oil-barrier between the air present and the opening in the disc shaped separator element, regardless of the rotational position at halt. This is possible by means of the inventive design of the partitioning element taking advantage of the effect of the difference in density between the oil and air, and the fluid connection provided between the first and second volume portion ensuring that the fluid opening remaining in fluid connection with the oil at all times, regardless of the rotational orientation.

Hereby, it is ensured that oil only is sucked back into the oil chamber as the oil cools down, and accordingly the performance of the power tool may be significantly improved.

The disc shaped element and/or the partitioning element may advantageously be designed such that at least one end of the partitioning element is always below a surface of the oil in the receiving space, regardless of the rotational orientation. Therefore, the disc shaped element may in some embodiments comprise a first half H1 and a second half H2, wherein the first volume portion is arranged in the first half. The partitioning element may further extend such that at least one of a first and a second end of the partitioning element is arranged at the other half.

The referenced power wrench may be a pneumatic wrench or an electrical wrench. Further, by disc shape should be understood a structure having a substantially circular circumference and a thickness considerably smaller than the diameter, but not necessarily a completely flat surface. The receiving space may be referred to as an air chamber, whereas the fluid opening may be described as an opening for pressure equalization. With regards to the orientation of the disc shaped separator element, the element may be arranged to extend in a plane normal to the output shaft. The disc shaped element may further be arranged to, when in use, extend in a substantially vertical plane. Further, in general, throughout the present specification, if nothing else is indicated the distances referred to are centre-centre distances i.e. for example the distance between the rotation axis and the centre of the opening, a mean distance between the axis of rotation and the referred separator element, sealing element and the like (i.e. a distance between the axis and a point located at a middle of the element measured in a radial direction).

According to one embodiment, the fluid communication is provided by means of a fluid passageway at least partly formed by said partitioning element. Accordingly, in such an embodiment, the first fluid volume portion may be defined in part by the partitioning element. For example, the fluid passageway may be formed between a sealing element forming the boundary of the receiving space and the partitioning element. Further, the fluid opening in such a case may be formed there between. According to one embodiment, the fluid passageway constitutes said first volume portion. I.e. the first volume is formed by the fluid passageway in turn formed by the partitioning element.

For example, according to one embodiment, the partitioning element may be arch-shaped and partially enclose said second volume. Such an embodiment is advantageous in that said partial enclosing may form a pocket, or trap, in which air may be trapped. More particularly, as the tool comes to a halt at a rotational position where the opening is positioned at a top position, the air may be trapped by such a pocket whereas the oil may be conducted to the opening via the fluid channel formed by such a partitioning element, thereby bypassing the trapped air. The skilled person realizes that any other similar shape such as a V-shape, a U-shape or a three-sided square or rectangle may theoretically provide an equivalent effect.

According to one embodiment, the fluid passageway extends at a radial distance a2 from the rotation axis (A-A) following a path (path length) defined by the shape of a portion of a circumference of said disc shaped separator element. In other words, such a fluid passageway may be described as being defined by a circle sector and extends along the circumference. Preferably the width of passageway, i.e. in a sense the difference between radial distances a1 and a2, is kept small, for example in the range 0.1-5 mm.

According to one embodiment, the fluid passageway extends at a radial distance a2 from the rotation axis (A-A) following a path defined by a shape of half of said circumference of said disc shaped separator element. In other words, such a fluid passageway may be described as having the shape of a semicircle and extends along the circumference.

According to one embodiment, the opening is arranged approximately in the middle of said fluid connection, measured lengthwise. I.e. such that half of the length of the fluid connection is present on one side of the opening, and the other half on the other side. For example, in the embodiment described above, the fluid passageway may extend along half the circumference of the disc, whereas the fluid opening may be arranged at the middle leaving a partial fluid passageway along ¼ of the circumference on each side.

According to one embodiment, the sealing arrangement comprises an outer seal and an inner seal, and wherein the inner seal form (or form part of) the partitioning means such that the fluid passageway way is provided by means of a channel delimited by the outer seal and the inner seal. Hereby, each of the outer and inner seal may extend between the disc shape separator element and the transverse wall. Each of the seal may either form part of the disc element, of the transverse wall or be provided as a separate unit arranged there between. Consequently, the channel may be further delimited by a surface of the disc shaped separator element and the transverse wall.

According to one embodiment, the outer seal, extends following the curvature of a circumference of the disc at a radial distance a2 from the rotation axis and is adapted to bear against the transverse wall and form a fluid tight seal there between, wherein the radial distance a2 is larger than the radial distance a1, and the inner seal extends following the curvature of a portion of the circumference at a radial distance a3 from the rotation axis and is adapted to bear against transverse wall and form a fluid tight seal there between, wherein the radial distance a3 is smaller than the radial distance a1, such that the fluidic connection is formed between the first and second seal. In other words, a channel having a partially radial shape is formed between the seals, where the inner seal may comprise or be comprised by said partitioning element, and the fluid opening is arranged in this channel. The distance a2 may be a distance such that the outer seal follows the edge of the disc shaped element (or the shape of the disc shaped element in the case of the outer seal being a separate seal or a seal comprised by the transverse wall). I.e., the outer seal may be circular to seal along the circumference, where the inner seal has the shape of a portion of a somewhat smaller circle, such that a channel having the shape of a circle sector. One particularly advantageous shape may be achieved if the inner seal has the shape of half a circle, such that the channel formed extends along half of the periphery (circumference).

According to one embodiment, the partitioning means comprises a tubular element such that said fluid passageway is provided therein. Examples include a tube, pipe, hose or similar.

According to one embodiment, the partitioning element forms part of said disc shaped separator element whereas according to another embodiment, the partitioning element forms part of said transverse wall. Embodiments comprising a separate partitioning element are conceivable as well within the scope. According to one embodiment, the partitioning element comprises a protruding shoulder. Such a shoulder may accordingly be arranged on, or form part of, either said disc shaped element or said transverse wall.

According to a second aspect of the present invention, a disc shaped separator element adapted to be arranged in a power wrench according to any of the embodiments described above, the disc shaped separator element comprising a sealing arrangement and a partitioning element. Objectives, advantages and features of the disc shaped separator element conceivable within the scope of the second aspect of the invention are readily understood by the foregoing discussion referring to the first aspect of the invention.

According to yet another aspect of the present invention a separating arrangement for use in a power wrench comprising a hydraulic pulse unit as described by the exemplary embodiment listed above, for extracting air from oil and comprising a disc shaped separator element, a sealing arrangement and a fluid opening located at a radial distance a1 from the rotation axis, wherein said separating arrangement further comprises a partitioning element.

Further objectives of, features of and advantages of the present invention will become apparent when studying the following detailed disclosure, the drawings and the appended claims. Those skilled in the art realize that different features of the present invention can be combined to create embodiments other than those described in the following.

BRIEF DESCRIPTION OF THE DRAWINGS

The invention will be described in the following illustrative and non-limiting detailed description of exemplary embodiments, with reference to the appended drawing, on which

Figure 1:
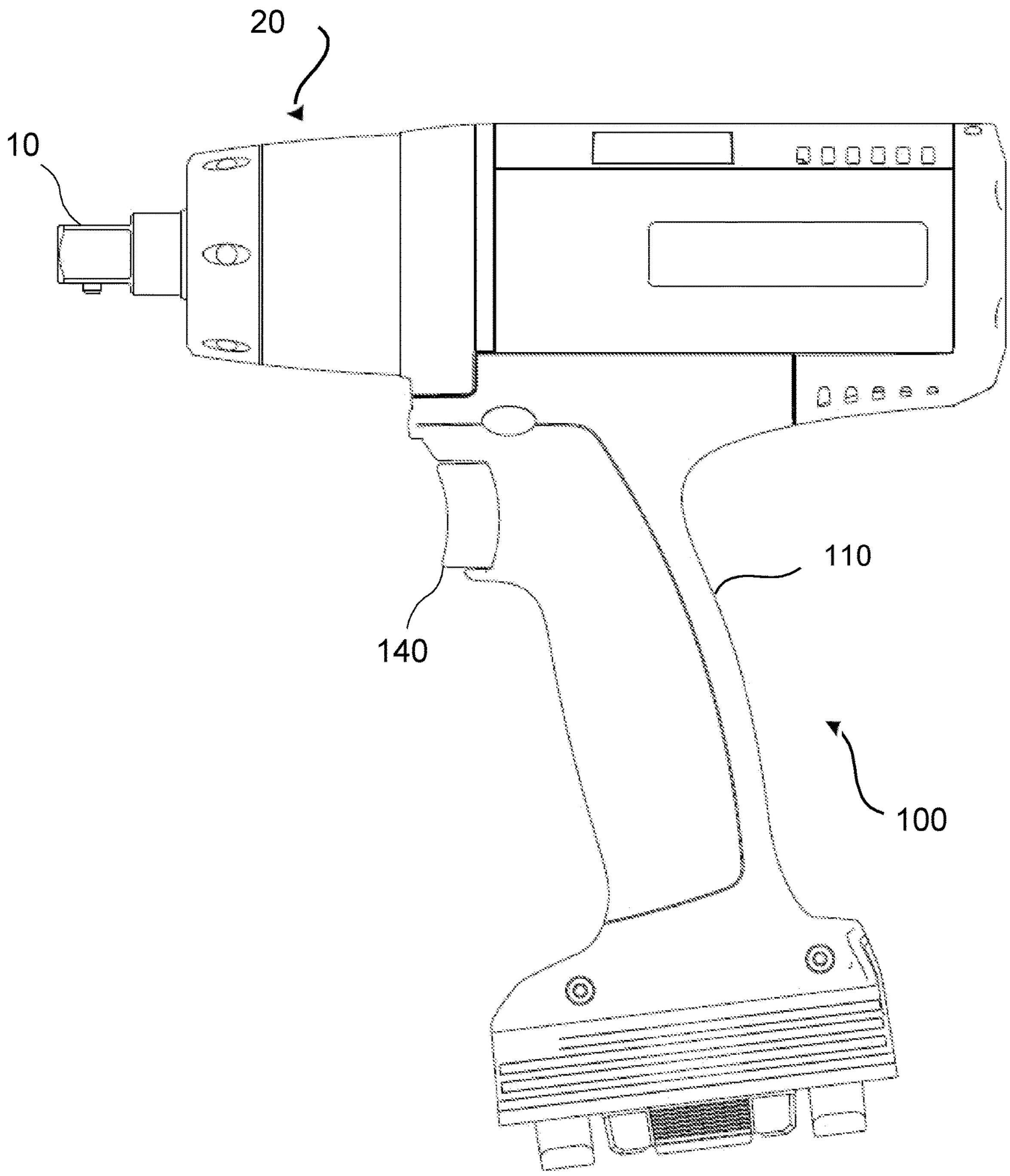
FIG. 1 is a perspective view of an exemplary power wrench according to one embodiment.

All figures are schematic, not necessarily to scale and generally only show parts which are necessary in order to elucidate the invention, wherein other parts may be omitted or merely suggested.

DETAILED DESCRIPTION

The power wrench shown as an example in the drawings is a pistol type wrench which comprises a housing 100 with a handle 110. For power control, the wrench is provided with a trigger button 140. In the housing there is further provided a non-illustrated motor, and a hydraulic pulse unit 20 with a square ended output shaft 10.

Figure 2:
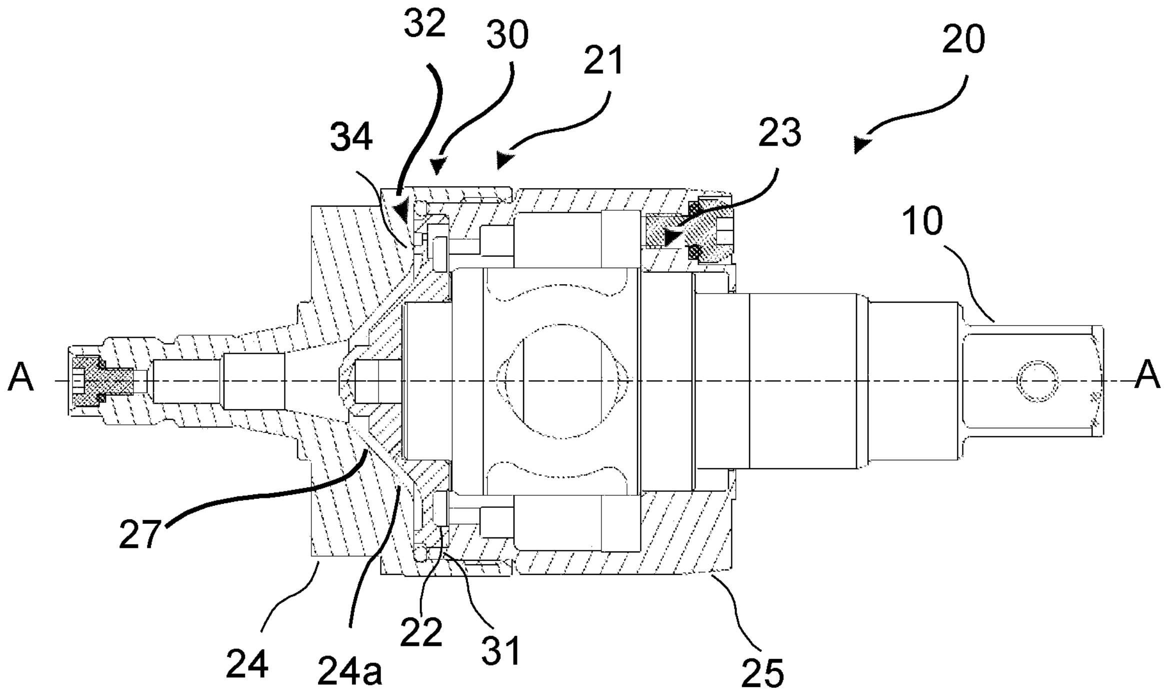
FIG. 2 is a cross sectional view of a hydraulic pulse unit according to one embodiment.

As illustrated in FIG. 2 the impulse unit comprises an inertia drive member 21 including a cylindrical front piece 25 and an end piece 24 and enclosing an oil chamber 22. The rear part 24, or end piece 24, is formed with a coupling portion for connection to the motor. The output shaft 10 has an impulse receiving portion which extends into the oil chamber 22 and is intermittently coupled to the drive member 21 via an impulse generating mechanism 23. The operation of the impulse mechanism per se is not described in any further detail since it is known in the art. Similar mechanisms has been previously described for example in U.S. Pat. Nos. 6,110,045 and 9,259,826.

The separating arrangement 30 is provided between the oil chamber 22 and a receiving space 27, or air chamber 27, and comprises a disc shaped separator element 31, a sealing arrangement 32 arranged to provide a seal between the disc and a transverse wall 24*a* of the end piece, or rear part 24, such that the receiving space 27 is formed there between. This receiving 27 space, at room temperature, contains a mixture of approximately 60% oil and 40% air, and may be described as a chamber into which oil may flow from the oil chamber 22 when heat expansion occurs whereby the air in the receiving space is compressed correspondingly in order to accommodate this oil volume. In order to allow this flow, the disc shaped separator element 31 comprises an oil outlet opening 33 at a distance a1 from the axis A-A, shown in FIG. 3.

Figure 3A:
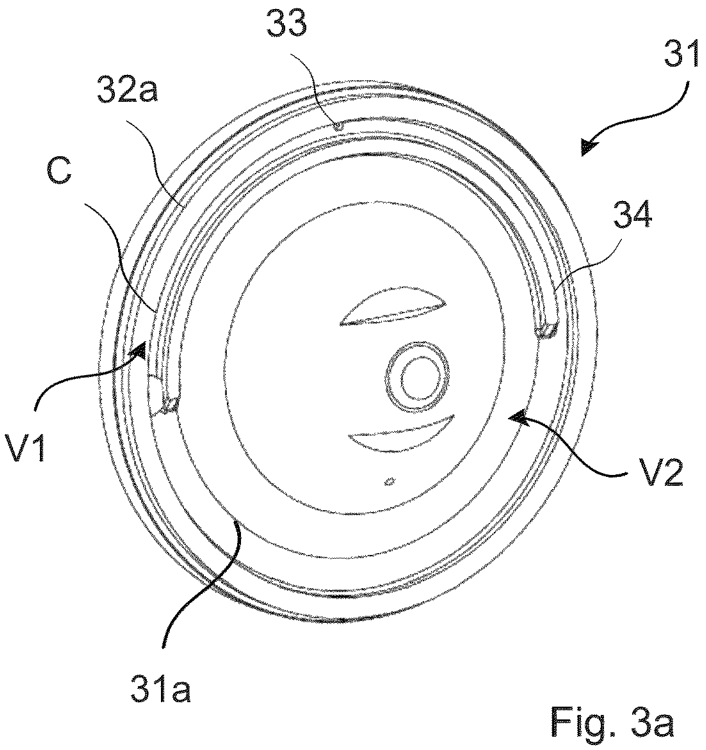
FIG. 3*a* is a perspective view of an exemplary disc shaped separator element according to one embodiment.
Figure 3B:
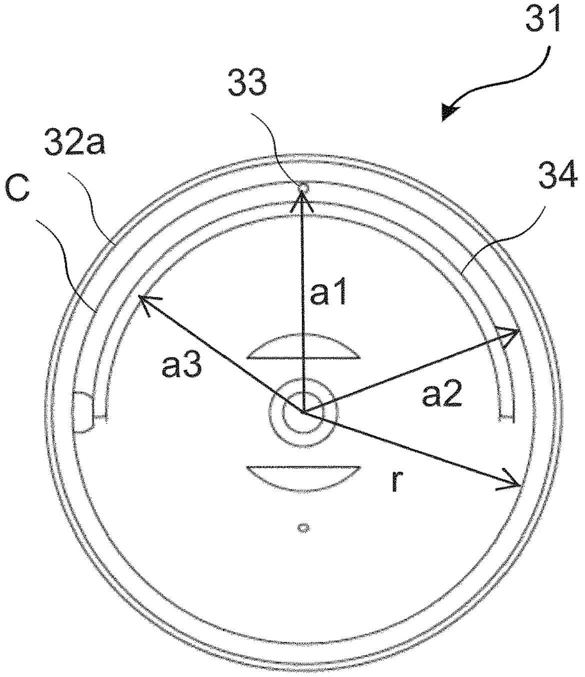
FIG. 3*b* is a front view of an exemplary disc shaped separator element according to one embodiment.

The disc shaped element 31 will now be described in greater detail with reference to FIGS. 3*a* and 3*b*. From FIG. 3 it may be recognized that in the illustrated embodiment, the surface 31*a* of the disc shaped element which faces the receiving space 27 has a slightly conical shape. The disc shaped element further comprises an outer seal 32*a* and a partitioning element 34 in the form of a protruding shoulder 34. The outer seal 32*a* extends along the circumference of the disc shaped element at a radial distance a2 from the rotation axis A-A and is adapted to bear against the transverse wall 24*a* of the rear part. The partitioning element 34 is in the illustrated embodiment formed by an inner seal and extends following the curvature of a portion of the circumference at a radial distance a3 from the rotation axis A-A and is also adapted to bear against transverse wall 24*a*. Accordingly the inner and outer seal have the same shape and thus a constant width channel C is formed there between, in the illustrated embodiment a channel C having the shape of half a circle.

As the disc shaped element 34 is arranged between the oil chamber 22 and the receiving space 27 a first volume portion V1 and a second volume portion V2 are formed partly delimited from each other by the partitioning element 34, the corresponding areas of the disc shaped element 31 are indicated in FIG. 3. The partitioning element 34 is however designed such that the first and second volume portion remain in fluid communication. The oil outlet opening 33 is in FIG. 3 shown at an upper portion of the disc. In the illustrated embodiment, the distance a1 is slightly less than the radius R of the disc shaped element 31. More particular, a1 is approximately equal to the radius of the disc minus the radial thickness of the outer seal 32*a*. This fluid channel C delimited by the outer and inner seal also provides a fluid passageway from the second volume to the first volume and consequently to the fluid opening 33, the fluid opening being arranged in the first volume portion.

During operation of the impulse unit the inertia drive member is rotated by the motor and a torque impulse is accomplished in the output shaft 10. The separating arrangement co-rotates with the inertia drive member.

As the oil heats up and expansion occurs, some oil will enter from the oil chamber 22 via the opening 33 into the receiving space 27, resulting in compression of the air volume in this space. As the tool halts however, the oil is cooled again and the oil is sucked back into the oil chamber 22.

However, due to the difference in density between air and oil, in an exemplary use case where the output shaft 10 extends in parallel to a horizontal surface and the disc shaped separator element 31 is positioned substantially vertically, the air moves to the upper part of the receiving space 27, whereas the heavier oil collects at the bottom of the space. The position of the flow opening 33 is on the other hand changed as the separating arrangement rotates and is arbitrary as the tool may be stopped at any time.

Figure 4A:
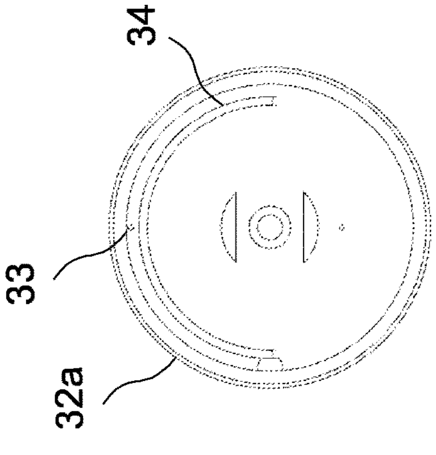
FIGS. 4*a-d* show the functionality of the separating arrangement at different rotational positions.
Figure 4B:
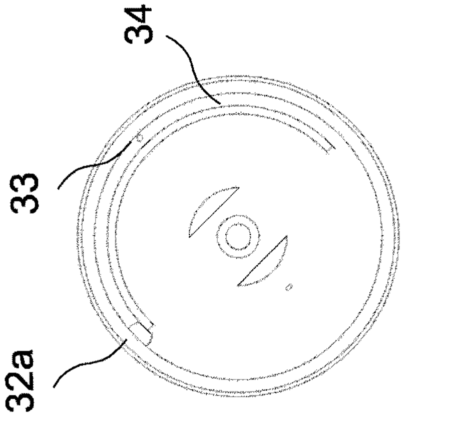
Figure 4C:
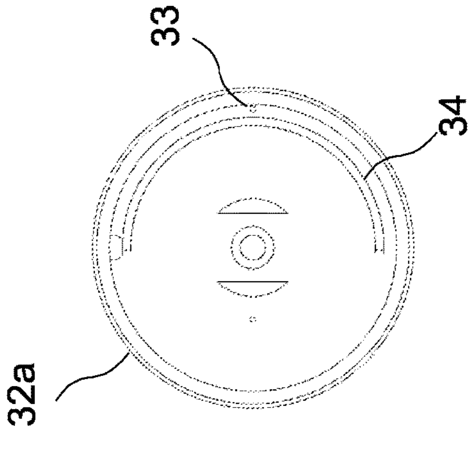
Figure 4D:
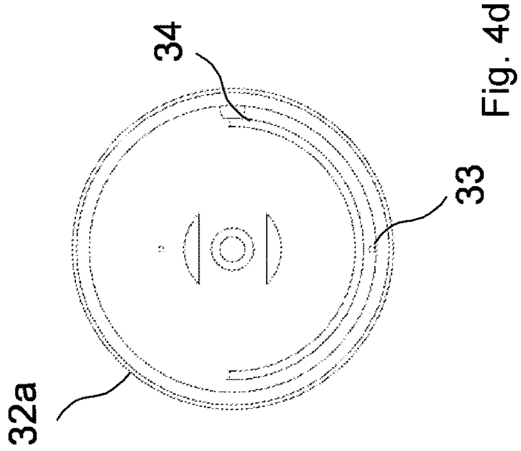

Turning to FIG. 4*a-d*, the functionality of the partitioning element 34 will be described. In FIG. 4*a*, the opening 33 is positioned at what will be referred to as a top position. Here, the partitioning element 34 acts both as a barrier preventing the air from reaching the opening 33, in a sense trapping the air in the pocket formed by the (arched) partitioning element, but also together with the outer seal 32*a* forming a fluid channel C through which the oil may flow into the opening 33. In FIG. 4*b*, the same disc is shown rotated 45°, the air is still trapped in the pocket or "air trap" formed by the partitioning element 34 and the oil flows through the same channel C. In FIG. 4*c*, showing the disc shaped element 31 rotated an additional 45° i.e. a total of 90° compared to FIG. 4*a*, the oil level is still well above the opening 33 and the air remains at the upper portion, and is not allowed to enter into the oil chamber 22 via the opening 33 due to the oil forming a barrier. Finally, in FIG. 4*d*, since the opening 33 is at the lowest position, the oil level is above both ends of the channel C and only oil enter the channel also at this position.

The element 34 is hence designed such that the oil is guided to form a barrier between the air and the opening 33 in the disc shaped separator element 31, regardless of the rotational position at halt. Or, in other words, at least one end of the channel is always below oil level, thus always providing a fluid connection for the oil to the opening and thus the chamber.

While the invention has been illustrated and described in detail in the drawings and foregoing description, such illustration and description are to be considered illustrative or exemplary and not restrictive; the invention is not limited to the disclosed embodiment. The skilled person understands that many modifications, variations and alterations are conceivable within the scope as defined in the appended claims. Additionally, variations to the disclosed embodiments can be understood and effected by those skilled in the art in practicing the claimed invention, form a study of the drawings, the disclosure and the appended claims. In the claims, the word "comprising" does not exclude other elements or steps and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the claims.

The invention claimed is:

1. A power wrench comprising:
- a motor;
- an output shaft; and
- a hydraulic pulse unit including an inertia drive member connected to the motor and rotatable about a rotation axis, an oil chamber enclosed in the inertia drive member, and an impulse generator arranged to intermittently transfer kinetic energy to the output shaft,
- wherein the inertia drive member comprises an end piece having a transverse wall,
- wherein a separating arrangement is provided for extracting air from oil, the separating arrangement comprising a disc-shaped separator element and a sealing arrangement configured to provide a seal between the disc-shaped separator element and the transverse end wall, thereby partly delimiting a receiving space therebetween in fluid communication with the oil chamber, the disc-shaped separator element providing a passageway between the oil chamber and the receiving space by a fluid opening located at a first radial distance from the rotation axis,
- wherein the separating arrangement further comprises a partitioning element arranged in the receiving space, such that a first partial volume is formed on a first side of the partitioning element and a second partial volume is formed on a second side of the partitioning element, wherein the first and second partial volumes are in fluid communication and wherein the fluid opening is arranged on the first side,
- wherein the fluid communication between the first and second partial volumes is provided by a fluid passageway at least partly formed by the partitioning element,
- wherein the sealing arrangement comprises an outer seal and an inner seal, and
- wherein the inner seal forms the partitioning element such that the fluid passageway is provided by a channel delimited by the outer seal and the inner seal.

2. The power wrench according to claim 1, wherein the fluid passageway constitutes the first volume portion.

3. The power wrench according to claim 2, wherein the fluid passageway extends at the first radial distance from the rotation axis following a path defined by a shape of a portion of a circumference of the disc-shaped separator element.

4. The power wrench according to claim 1, wherein the fluid passageway extends at the first radial distance from the rotation axis following a path defined by a shape of half of a circumference of the disc-shaped separator element.

5. The power wrench according to claim 1, wherein the fluid opening is arranged approximately in the middle of the fluid passageway, measured lengthwise.

6. The power wrench according to claim 1, wherein the outer seal extends following a curvature of a circumference of the disc-shaped separator element at a second radial distance from the rotation axis and is adapted to bear against the transverse wall and form a fluid-tight seal therebetween, wherein the second radial distance is larger than the first radial distance, and
- wherein the inner seal extends following the curvature of a portion of the circumference at a third radial distance from the rotation axis and is adapted to bear against transverse wall and form a fluid-tight seal therebetween, wherein the third radial distance is smaller than the first radial distance, such that the fluid passageway is formed between the inner and outer seals.

7. The power wrench according to claim 1, wherein the partitioning element comprises a protruding shoulder.

8. The power wrench according to claim 1, wherein the partitioning element comprises a tubular element such that the fluid passageway is provided therein.

9. The power wrench according to claim 1, wherein the partitioning element forms part of the disc-shaped separator element.

10. The power wrench according to claim 1, wherein the partitioning element forms part of the transverse wall.

11. The power wrench according to claim 1, wherein the wrench is an electric wrench.

12. The power wrench according to claim 1, wherein the wrench is a pneumatic wrench.

13. A disc-shaped separator element for use in a separating arrangement in a power wrench that includes a motor, an output shaft, and a hydraulic pulse unit including an inertia drive member connected to the motor and rotatable about a rotation axis, the disc-shaped separator element comprising:

a fluid opening located at a radial distance from the rotation axis; and a partitioning element configured such that a first partial volume is formed on a first side of the partitioning element and a second partial volume is formed on a second side of the partitioning element;

an outer seal; and an inner seal which forms the partitioning element, wherein the first and second partial volumes are in fluid communication, wherein the opening is arranged on the first side of the partitioning element, and wherein a fluid passageway is provided by a channel delimited by the outer seal and the inner seal.

* * * * *